Patented Jan. 13, 1948

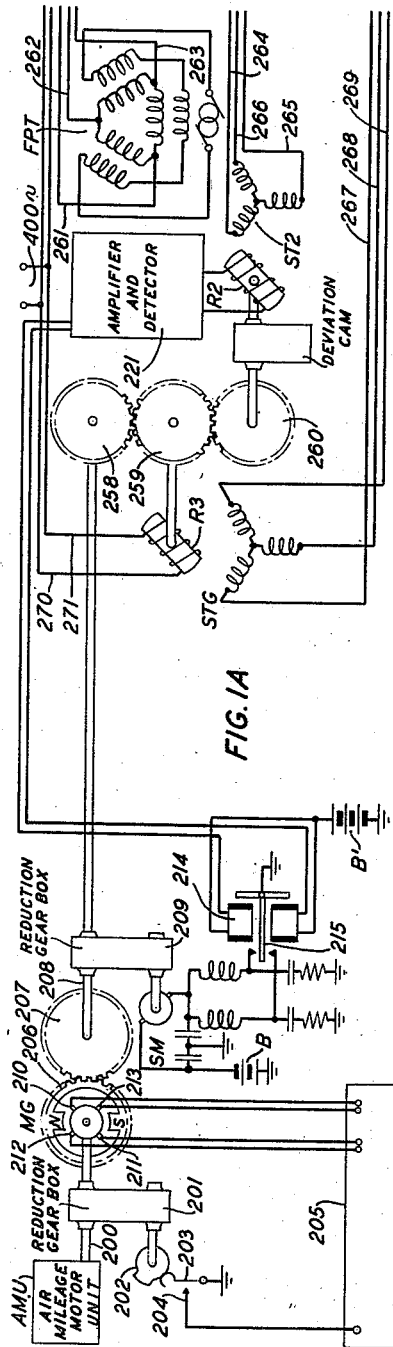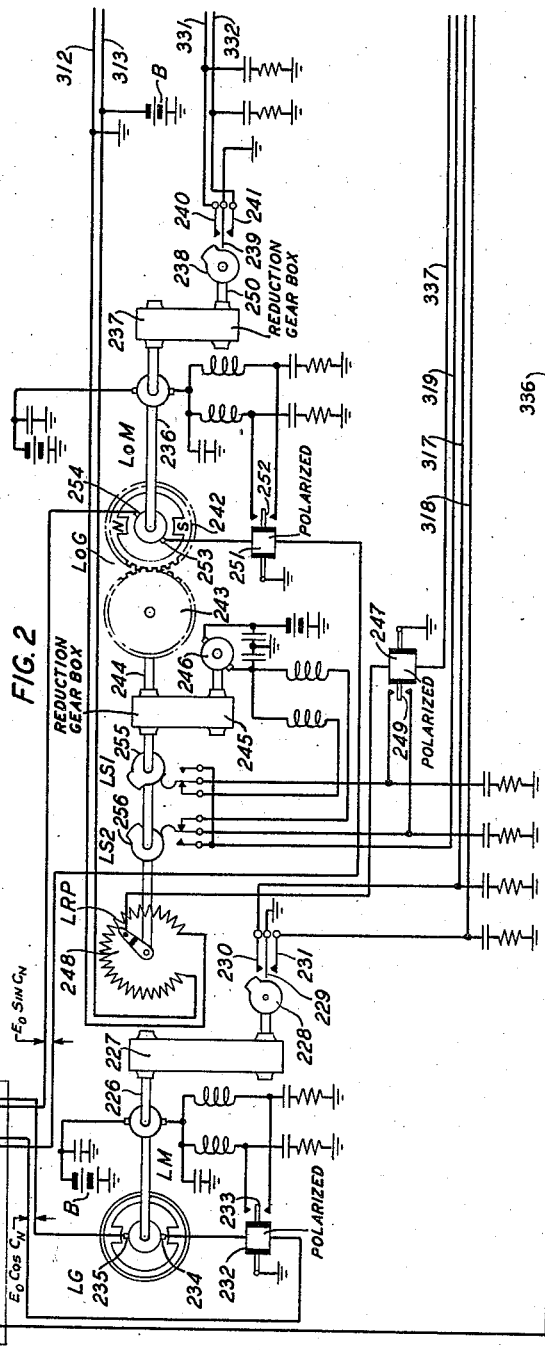

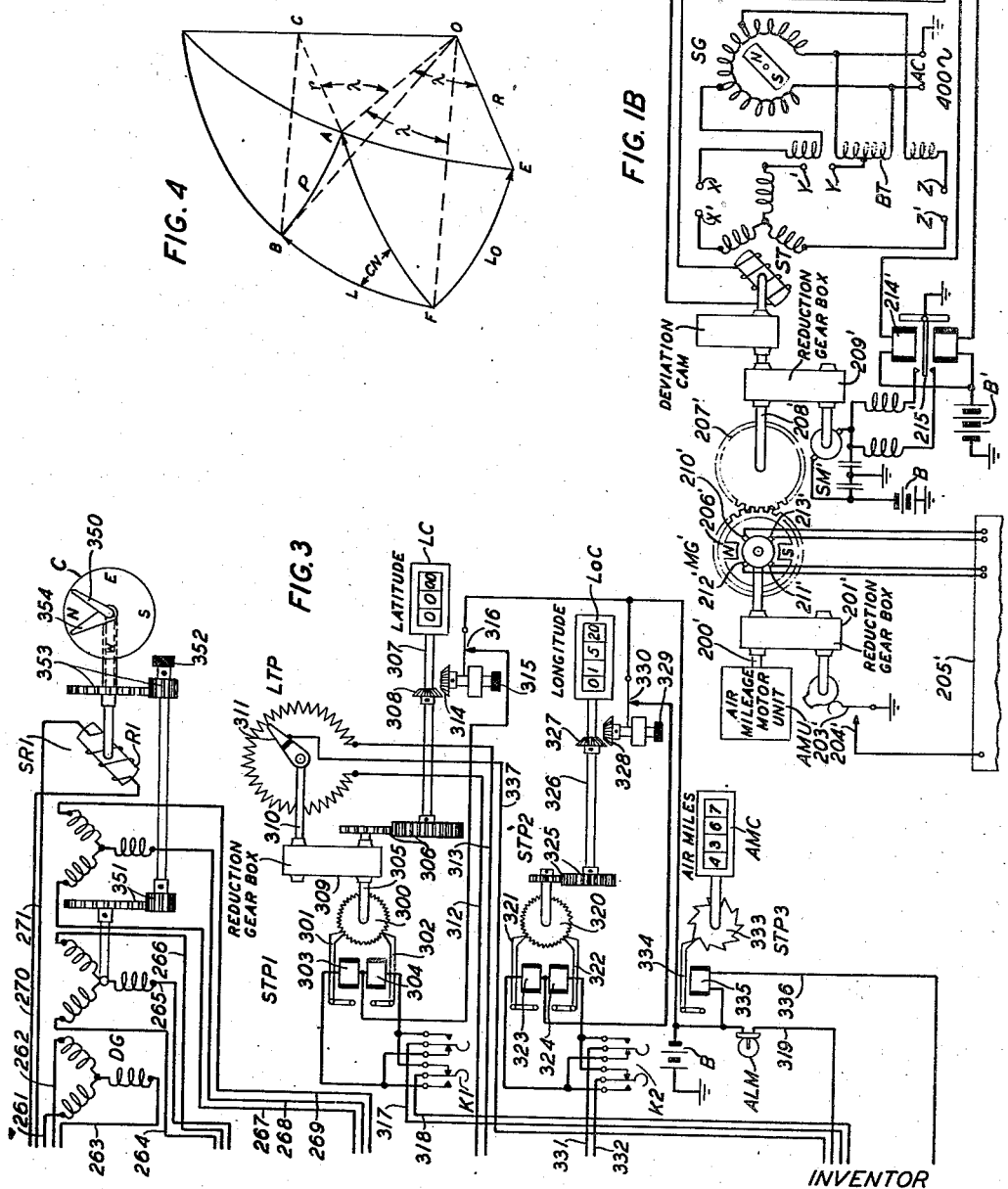

2,434,270

UNITED STATES PATENT OFFICE 2,434,270

ELECTRIC AIR POSITION INDICATOR

William H. T. Holden, Woodside, N. Y., assignor to Bell Telephone Laboratories, Incorporated, New York, N. Y., a corporation of New York Application March 24, 1944, Serial No. 527,999

11 Claims. (Cl. 235—61)

This invention relates to an air position indicator for use on an aircraft for enabling the pilot or the navigator to determine at any instant the latitude and longitude of his position and the air miles he has flown from any specified take-off point. More particularly the invention is concerned with the provision of electrical equipment for controlling indicators which continuously indicate the aircraft position in degrees and minutes of latitude and longitude and the air miles which have been flown.

The utility of apparatus of this character is quite evident. On ships the problem of determining the ship's position at any instant is not difficult due to the slow speed at which surface ships sail and due to the fact that such ships always carry a navigator as a member of the crew who has ample time to make celestial observations, to do the navigational plotting that is necessitated from the data secured from such observations and to keep the necessary records of course and speed to enable a dead reckoning position to be always known. However aircraft, and particularly airplanes which have high cruising speeds, present a more difficult problem for solving navigational data to determine positions. This is particularly true of airplanes of the high speed type which may not have space to accommodate a navigator as a part of the crew. Furthermore in aerial navigation under war conditions, evasive action involves such frequent changes of course and speed that a navigator cannot keep an accurate log from which the dead reckoning position may be obtained. The apparatus which is the subject of this invention may be described as an automatic dead reckoning device.

In my copending application Serial No. 527,998, filed concurrently herewith, now Patent No. 2,406,836, I have disclosed an air position indicator electrically controlled in accordance with the air speed of an aircraft and with the true compass course of the flight to continuously indicate the latitude and longitude of the air position of the aircraft and the air miles which have been flown whereby substantially accurate indications are made possible. The electrical apparatus of such air position indicator requires that the airplane in which it is installed be provided with a source of 400-cycle, 26-volt alternating current and with a source of 26-volt direct current. Most modern airplanes are provided with such sources of current for operating the electrical equipment thereof. However, some types of airplanes while having a source of 26-volt direct current, do not have a source of 400-cycle alternating current and other types which are provided with such an alternating current source, do not have a source of adequate capacity to carry the extra load which would be imposed thereon by the installation of air position indicator apparatus of the alternating current type.

It is therefore one object of the present invention to provide apparatus operative by direct current which will continuously indicate the latitude and longitude of the air position of the airplane in which it is installed and the number of air miles flown.

It is a further object of the invention to provide in such an air position indicator apparatus remote control circuits whereby the indicating instruments may be so compactly assembled that they may be mounted on the instrument panel of an airplane and whereby the circuits and apparatus for controlling such instruments may be located remotely therefrom in any location in the airplane where mounting space is available.

To attain these objects apparatus has been designed in two parts, an indicating unit and a control unit. Most modern airplanes are equipped with an air mileage unit and with either a remote control earth inductor compass, known as the so-called "flux gate" compass or a remote control magnetic compass, known as the so-called "magnesyn" compass. From these units information may be secured concerning the air speed and the compass course of the airplane flight for enabling a control unit to control the indicator unit. The indicator unit is provided with three indicators which may be of the counting wheel type, one of which is controlled to indicate the air miles flown, the second of which indicates the degrees and minutes of latitude of the instant position of the airplane, and the third of which indicates the degrees and minutes of longitude of the instant position of the airplane. An additional indicator may also be provided with a pointer and compass rose for indicating the true compass course of the flight. Provision is made for enabling the latitude and longitude indicators to be reset to indicate the latitude and longitude of the position of the airplane at some known point as, for example, at the take-off of a flight and with means for enabling the indicators to be operated in one or the other direction dependent on whether the flight is being conducted in the north or south hemisphere or east or west of a particular reference meridian.

In order that the indicator assembly may be made sufficiently compact so that it may be mounted in the usual instrument panel in front of the pilot, each indicator is arranged to be operated by a stepping mechanism individual thereto.

The control unit comprises three assemblies each comprising a direct current motor operable from the 26-volt direct current supply of the airplane and a direct current generator coupled therewith. Each of the direct current motors is of the reversible split field series-connected type and each of the generators is of the bipolar magneto type although these generators could be of the bipolar type having field windings.

The master motor and generator assembly which is provided to control the advance of the air miles indicator of the indicator unit has a cam geared to the rotor shaft of the generator through a reduction gear box which controls the closure of contacts once for each air mile flown for completing the stepping circuit of the air miles indicator. The generator is provided with two pairs of commutator brushes positioned in quadrature and displaceable with respect to the polar axis of the generator field. The brushes may be mounted in a carrier rotatable with respect to the generator frame of the generator or preferably the brushes may be fixedly mounted on the generator frame and the field may be rotatable with respect thereto, as disclosed, through the operation of the associated motor of the assembly. With a generator thus constructed I have discovered that when the displacement of the brushes with respect to the polar axis of the field is equal to the angle $C_N$ then a potential may be derived across one pair of brushes which varies in accordance with the sine of the angle $C_N$ and a potential may be derived across the other pair of brushes which varies in accordance with the cosine of the angle $C_N$. If then the generator is driven from the air mileage unit of the airplane at a speed which is commensurate with the air speed of the airplane and generates a potential across the polar axis equal to $E_0$ and a motor is operated to orient the brushes with respect to such polar axis through an angle $C_N$ equal to the compass course angle of the flight, then the potential $E_1$ appearing across one pair of brushes is equal to $E_0 \sin C_N$ and the potential $E_2$ appearing across the other pair of brushes is equal to $E_0 \cos C_N$.

The motor and generator assembly which is provided for advancing the latitude indicator comprises a motor which drives a feedback generator coupled therewith until it attains a speed at which it generates a potential equal to the potential $E_0 \cos C_N$ generated by the generator of the master motor and generator assembly. This motor drives a cam geared to its shaft through a reduction gear box, which controls the closure of contacts once per minute of latitude of the flight course flown for completing a circuit through one or the other stepping magnet of the latitude indicator dependent upon the direction of rotation of the motor.

The motor and generator assembly which is provided for advancing the longitude indicator comprises a generator similar to the generator of the master motor-generator set but provided with only one pair of brushes. The field of this generator is oriented with respect to the brushes by means of a servo-motor coupled therewith through a reduction gear box. The servo-motor is controlled over circuits controlled by the latitude indicator so that the polar axis of the field may be oriented with respect to the brush set through an angle equal to the angle λ of latitude whereby the potential across the brushes of the generator varies in accordance with the cosine of this angle. The associated motor of the motor and generator assembly drives the generator until it reaches a speed at which it generates a potential equal to the potential $E_0 \sin C_N$ generated by the generator of the master motor and generator assembly. This motor also drives a cam geared to its shaft through a reduction gear box which controls the closure of contacts once for each minute of longitude of the flight course flown for completing a circuit through one or the other stepping magnet of the longitude indicator dependent upon the direction of rotation of the motor.

For a clearer understanding of the invention and the mode of its operation, reference may be had to the following detailed description thereof when read in connection with the accompanying drawings in which:

Fig. 1A shows the master motor-generator set of the air position indicator of the present invention and the manner in which it is controlled from the air mileage motor unit and from the "flux gate" compass unit of an airplane;

Fig. 1B shows a modified master motor-generator set to be used in lieu of the motor-generator set of Fig. 1A in an airplane equipped with a compass unit of the "magnesyn" type;

Fig. 2 shows the motor-generator sets for controlling the latitude and longitude indicators of the indicator unit disclosed in Fig. 3;

Fig. 3 shows schematically the apparatus and circuits of the air position indicator unit; and Fig. 4 is a vector diagram explanatory of the theoretical aspects of the invention.

The indicator disclosed in Fig. 3 includes two two-directional stepping devices STP1 and STP2 and a single directional stepping device STP3. Each of the stepping devices STP1 and STP2 comprises a single ratchet wheel, such as 300, with which two stepping pawls, such as 301 and 302, cooperate. The pawl 301 is operable by the stepping magnet 303 to advance the ratchet wheel 300, for example, in a clockwise direction and the pawl 302 is operable by the stepping magnet 304 to advance the ratchet wheel 300 in the opposite direction.

The ratchet wheel 300 of the stepping device STP1 is mounted upon the input shaft 305 of the reduction gear box 309 which is connected by the reduction gears 306, having a reduction ratio of 1½ to 1, to the input shaft 307 of the latitude counter LC. Shaft 307 also carries the bevel gear 308. The input shaft of the latitude counter is rotated through one revolution by sixty steps of the stepping device and this rotates the input wheel of the counter, which is graduated 0 to 59 minutes, one revolution for each degree of latitude. The other wheels of the latitude counter are advanced by decimal Geneva movements in the usual manner to register the units and tens of the degrees of latitude.

Mounted on the output shaft 310 of the reduction gear box 309 is the brush 311 of the latitude transmitter potentiometer LTP which brush is connected over conductor 337 through the winding of polarized relay 247 of Fig. 2 with the brush 248 of the latitude receiver potentiometer LRP. The corresponding winding terminals of these potentiometers are interconnected over conductors 312 and 313 which are respectively connected to ground and to battery.

The bevel gear 308 may be meshed with the setting gear 314 when the setting knob 315 is pushed inwardly against the tension of spring 316 and may then be rotated by the knob 315 when it is desired to set the counter LC as at a definite fix or landmark the latitude of which is known. When the knob 315 is pushed in to reset the counter LC the spring 316 disengages its normal contact to disconnect the battery B from the windings of stepping magnets 303 and 304 so that such magnets are ineffective during the resetting operation.

When a flight is being conducted in the northern hemisphere the stepping control conductors 317 and 318 are connected over the normal contacts of the key K1 to the windings of magnets 303 and 304 respectively of the stepping device STP1 so that the counter LC will increase its reading as the flight proceeds northward and will decrease its reading if the flight proceeds southward toward the equator. When the equator is crossed a reading of 00 degrees 00 minutes would be followed by a reading of 99 degrees 59 minutes as the flight proceeds into the southern hemisphere. In order therefore that the counter may increase its reading through 00 degrees 01 minutes, etc., the key K1 is provided which when depressed directs stepping impulses incoming over conductor 317 to magnet 304 rather than to magnet 303, and directs stepping impulses incoming over conductor 318 to magnet 303 rather than to magnet 304 whereby the navigator or pilot may reverse the rotation of the counter LC as the flight crosses the equator.

The ratchet wheel 320 of the stepping device STP2 is operable in a clockwise direction by the pawl 321 under the control of stepping magnet 323 and in a counter-clockwise direction by the pawl 322 under the control of stepping magnet 324. The ratchet wheel is mounted on a shaft which is coupled by the reduction gears 325, which have a reduction gear ratio of 1½ to 1, to the input shaft 326 of the longitude counter LoC. Shaft 326 also carries the bevel gear 327. The input shaft of the longitude counter is rotated through one revolution by sixty steps of the stepping device and thus rotates the input wheel of the counter which is graduated 0 to 59 minutes, one revolution for each degree of longitude. The other wheels of the longitude counter are advanced by decimal Geneva movements in the usual manner to register the units, tens and hundreds of the degrees of longitude.

Bevel gear 327 may be meshed with the setting gear 328 when the setting knob 329 is pushed inwardly against the tension of spring 330 and may then be rotated by the knob 329 when it is desired to set the counter LoC as at a definite fix or landmark the longitude of which is known. When the knob 329 is pushed in to reset the counter LoC the spring 330 disengages its normal contact to disconnect battery B from the windings of stepping magnets 323 and 324 so that such magnets are ineffective during the resetting operation.

When a flight is being conducted in the eastern hemisphere or east of the reference meridian the stepping control conductors 331 and 332 are connected over the normal contacts of key K2 to the windings of magnets 323 and 324, respectively, of the stepping device STP2 so that the counter LoC will increase its reading as the flight proceeds eastward and will decrease its reading if the flight proceeds westward towards the reference meridian. This counter may read 000 degrees 00 minutes to 999 degrees 59 minutes, but the maximum useful range is, of course, 00 degrees 000 minutes to 180 degrees 00 minutes east or west. When the reference meridian is crossed a reading 000 degrees 00 minutes would be followed by 999 degrees 59 minutes as the flight proceeds into the western hemisphere. In order, therefore, that the counter may increase its reading through 000 degrees 01 minutes, etc., the key K2 is provided which when depressed directs stepping impulses incoming over conductor 331 to magnet 324 rather than to magnet 323 and directs stepping impulses incoming over conductor 332 to magnet 323 rather than to magnet 324, whereby the navigator or pilot may reverse the rotation of the counter as the flight crosses the reference meridian.

The ratchet wheel 333 of the stepping device STP3 is rotatable in but one direction through the operation of the stepping pawl 334 under the control of the stepping magnet 335. This ratchet wheel, which has ten teeth, is mounted on the input shaft of the air miles counter AMC the input wheel of which is graduated 0 to 9 and moves step by step making one revolution for each ten nautical miles of the flight. The other wheels of this counter are advanced by decimal Geneva movements in the usual manner to register the tens, hundreds and thousands of miles.

The indicator is also provided with a lamp ALM which becomes lighted over conductor 319 whenever the limit switches LS1 or LS2 of Fig. 2 are operated upon the rotation of the orienting shaft of the generator LoG beyond a specified limit in either direction as will be later described.

The output shaft of the air mileage unit AMU of Fig. 1A is connected directly to the input shaft 200 of the reduction gear box 201 and to the rotor shaft of the direct current generator MG. The output shaft of the gear box, which box has a reduction gear ratio of 1440 to 1, carries the cam 202 which once per revolution engages spring 203 with contact 204. Contact 204 is strapped over terminals of the cross-connecting block 205 to conductor 336 whereby, once per revolution of the output shaft of gear box 201 or once for each nautical mile flown, the circuit of stepping magnet 335 of the stepping device STP3 is energized to advance the air miles counter AMC.

Generator MG is provided with a permanent magnet field having two specially shaped field poles. The field is rotatable with respect to the frame of the generator, as indicated schematically, by the ring gear 206 secured to the field and the gear 207 secured to the shaft 208 which is rotated by the servo-motor SM through the reduction gear box 209. The rotor of the generator is mounted in bearings attached to the stationary frame which carries the four brushes 210, 211, 212 and 213 spaced 90 degrees apart around the commutator. The field poles are so shaped as to secure a sinusoidal variation of the output potential $E_1$ across the brushes 210 and 211 and of the output potential $E_2$ across the brushes 212 and 213 with the orientation of the field position, to within plus or minus 1 per cent, in such a way that when the output potential across the rotor at the polar axis of the field is $E_0$ then $E_1 = E_0 \cos C_N$ and $E_2 = E_0 \sin C_N$ when $C_N$ is the angular displacement of the polar axis of the field.

The servo-motor SM is of the direct current reversible split field series-connected type and is controlled by the three-position differential relay 214. The armature 215 of relay 214 may be operated into engagement with either its upper or lower contact to establish a circuit through one or the other of the field windings of the motor SM to cause the motor to run in one or the other direction under the control of the amplifier-detector 221 and thus under the control of the output of synchro-transformer ST2.

For controlling the amplifier-detector mechanism 221 and servo-motor SM the flux gate primary transmitter FPT is connected over conductors 261, 262 and 263 with the stator windings of the differential generator DG, the Y-connected rotor windings of which are connected over conductors 264, 265 and 266 with the corresponding stator windings of the synchro-transformer ST2. The rotor winding R2 of the synchro-transformer is connected to the input circuit of the amplifier-detector 221 and is rotatable through the unity ratio gears 258, 259 and 260 and through the deviation cam, represented by the box so labeled, by the servo-motor SM. The rotor of the differential generator DG is rotatable by the setting knob 352 through the gears 351 to introduce a magnetic correction for the compass.

If the airplane is equipped with a "magnesyn" type compass control, the circuit disclosed in Fig. 1B would be used in place of the circuit of Fig. 1A. This circuit is substantially the same as that of Fig. 1A except that a magnesyn generator SG and a synchro-transformer ST are employed in the telemetric system. The permanent magnet rotor of the generator SG is mounted as part of a compass rotatable by the earth's field in accordance with the compass course of the flight of the airplane. The rotor is rotatable within the stator windings which are energized by 400-cycle alternating current and which are connected through the windings of the balancing transformer BT with the stator windings of the synchro-transformer ST. The rotor of the synchro-transformer is connected through the deviation cam, represented by the box so labeled, with the output shaft 208' of the reduction gear box 209' the input shaft of which is driven by the servo-motor SM'. The rotor winding of the synchro-transformer is connected with the output circuit of the amplifier AMP. Thus in response to the rotation of the rotor of the magnesyn generator SG, potential is impressed upon the rotor winding of the synchro-transformer ST which is amplified by the amplifier AMP and which is instrumental in operating the differential relay 214' to control the servo-motor SM' and thus through the gear box 209' to rotate the rotor of the synchro-transformer ST until it assumes a position in which no potential is impressed upon its winding, that is, a position corresponding to the position of the rotor of the generator SG.

For introducing a compass correction a differential generator such as DG disclosed in Fig. 3 may be employed. For this purpose terminals X, Y and Z associated with the windings of the balancing transformer BT would be connected to conductors 261, 262 and 263 and thence to the stator windings of the generator DG and the rotor windings of the generator DG would be connected over conductors 264, 265 and 266 to the terminals X', Y' and Z' and thus with the stator windings of the synchro-transformer ST.

To control the indicator C, a secondary transmitting generator such as STG of Fig. 1A would be operated by a gear meshed with gear 207', having its rotor winding connected with the rotor winding of synchro-receiver SR1 of Fig. 3 and having its stator windings connected with the stator windings of receiver SR1.

The motor and generator assembly for controlling the latitude counter LC of Fig. 3 comprises a direct current permanent magnet field generator LG having an output potential equal to that of the master generator MG when it is running at the same speed. Its rotor is directly connected to the rotor of the reversible split field series-connected direct current motor LM and to the input shaft 226 of the reduction gear box 227. The gear box has a gear reduction ration of 1440 to 1 and the output shaft thereof carries the cam 228 which, once per revolution or once per minute of latitude of the flight, engages the spring 229 with the spring 230 or with the spring 231 dependent upon the direction of rotation of cam 228 and the direction of rotation of the rotor of motor LM. Contact springs 230 and 231 are connected to conductors 317 and 318 over which stepping impulses generated by the movement of spring 229 are transmitted to the magnets 303 and 304 of the stepping device STP1 associated with the latitude counter LC of Fig. 3.

The motor and generator assembly for controlling the longitude counter LoC of Fig. 3 comprises a direct current generator LoG of substantially the same type as master generator MG but has a potential output four times as great for the same speed of rotation. The rotor of generator LoG is coupled directly to the rotor of the reversible split field series-connected motor LoM and to the input shaft 236 of the reduction gear box 237. The gear box has a reduction gear ratio of 360 to 1 between its input shaft and the output shaft 250 and the output shaft 250 carries the cam 238 which, once per revolution, engages the spring 239 with the spring 240 or with the spring 241 dependent upon the direction of rotation of cam 238 and the direction of rotation of the rotor of motor LoM. Contact springs 240 and 241 are connected to conductors 331 and 332 over which stepping impulses generated by the movement of spring 239 are transmitted to the magnets 323 and 324 of the stepping device STP2 associated with the longitude counter LoC of Fig. 3 at the rate of one impulse for each minute of longitude flown on the flight.

The generator LoG has a permanent magnet field rotatable with respect to the generator frame, as schematically indicated, by the ring gear 242 secured to the field and the gear 243 secured to the output shaft 244 of the reduction gear box 245. The input shaft of the gear box 245 is rotated in one or the other direction by the reversible split field series-connected servo-motor 246. The motor 246 is controlled by the three-position polarized relay 247. The armature 249 of relay 247 may be operated into engagement with either its upper or lower contact to establish a circuit through one or the other of the field windings of motor 246 to cause the motor to run in one or the other direction under the control of the potentiometer LRP serving as the receiver of a telemetric control system including the transmitter LTP operated by the latitude counter LC of Fig. 3. The reduction gear ratio between the input shaft 305 and output shaft 310 of the gear box 309 of Fig. 3 and the reduction gear ratio between the input shaft and the upper output shaft of gear box 246 are so chosen that the field of generator LoG is rotatable from a zero position, in which its polar axis is aligned with the brushes, through an angle equal to the latitude angle recorded by the latitude counter LC. Since latitude readings beyond 75 degrees 30 minutes north or 75 degrees 30 minutes south are not used, it is not necessary to rotate the field of generator LoG more than 75 degrees and 30 minutes either way from the zero position.

The motor LoM is controlled by the three-position polarized relay 251, the armature 252 of which may be operated into engagement with either its upper or lower contact to establish a circuit through one or the other of the field windings and in series with the rotor winding and the battery B to cause the motor to run in one or the other direction under the joint control of the master generator MG and the feedback generator LoG as will be hereinafter described. For this purpose one terminal of the winding of relay 251 is connected to brush 253 of generator LoG and the other terminal of the winding is connected over strapped terminals of cross-connecting block 205 to brush 212 of master generator MG, the opposite brush 213 of which is connected over other terminals to block 205 to the other brush 254 of generator LoG.

Also mounted on the shaft 244 are the operating cams 255 and 256 of the limit switches LS1 and LS2. These cams are so positioned on the shaft that cam 255 is effective to operate the transfer springs of switch LS1 to open the circuit through that one of the field windings of motor 246 which is at the time energized if the field of generator LoG is rotated more than 76 degrees in one direction from the position in which its polar axis is aligned with the brushes 253 and 254 and that cam 256 is effective to operate the transfer springs of the switch LS2 to open the circuit through the other field winding of motor 246 if the field of generator LoG is rotated more than 76 degrees in the other direction from the position in which its polar axis is aligned with the brushes 253 and 254. The limit switches LS1 and LS2 thus prevent overtravel of the field of generator LoG and limit its travel to approximately 152 degrees. When either one of the limit switches is operated, a circuit is established from ground over a contact of relay 247 and the contacts of the operated limit switch to conductor 319 whereby the alarm lamp ALM mounted on the indicator housing is caused to light.

In order that the pilot may have an indication of the true course which he is flying, a compass indicator C is installed as a part of the instrument shown in Fig. 3 or is separately installed on the instrument panel. The compass pointer 350 is mounted on the shaft of the rotor R1 of the synchro-receiver SR1, the stator windings of which are connected over conductors 267, 268 and 269 with the corresponding stator windings of the secondary transmitting generator STG. The rotor winding R3 of the generator STG is rotatable through the gears 258 and 259 by the servo-motor SM and the windings of the rotors R2 and R3 are interconnected by conductors 270 and 271 and energized by the source of 400-cycle current of the airplane. The rotation of the rotor winding R3 of the secondary transmitting generator STG by the servo-motor SM is thus instrumental in rotating the compass pointer 350, with the magnetic correction introduced by the differential generator DG under the control of the setting knob 352 and the correction made by the deviation cam. When the rotor of the differential generator is turned by the knob 352 the correction pointer 354 is simultaneously oriented through the gears 353.

With the differential generator DG interposed between the generator FPT and the synchro-transformer ST2, the rotor of transformer ST2 will, through the servo-motor SM and amplifier-detector 221, follow the primary transmitting generator FPT but its position will differ by the magnetic correction angle introduced by the setting of the rotor winding of the differential generator DG as indicated by the correction pointer 354.

The apparatus employed in embodying the invention having now been described the manner in which the apparatus functions and particularly the apparatus disclosed in Figs. 1A, 2 and 3 will first be discussed. It will be assumed that the airplane in which the air position indicator is installed starts a flight from a position of 00 degrees 00 minutes latitude and 015 degree 20 minutes longitude in the eastern and northern hemispheres. The pilot knows the latitude and longitude of the position of take-off and therefore resets the latitude and longitude counters LC and LoC by the operation of the reset knobs 315 and 329 in the manner previously described so that they indicate this position as disclosed in Fig. 3. He also sees that keys K1 and K2 are in positions indicative of the flight to be made in the northern and eastern hemispheres. It will also be assumed that previous to the contemplated flight the airplane has been flown 4367 nautical air miles as indicated by the air miles counter AMC.

It will be assumed that a flight is made in the direction indicated by the line FA in Fig. 4 with a true compass course of C$_N$ degrees as indicated by the compass C and at such a true air speed that the distance traveled at the time an observation is to be made may be indicated by the vector FA. The latitude distance component FB of the vector FA is therefore FA cos C$_N$ and the distance BA or $\rho$ along the latitude parallel through the point A is therefore FA sin C$_N$. The air speed is measured by the air mileage unit AMU which drives the rotor of generator MG at an angular velocity $\omega_0$ commensurate with the air speed or $\omega_0 = K_0 V_t$ where the true air speed is expressed as $V_t$. As the flight progresses from the point of take-off F along the vector direction FA, the cam 202 is driven through the gear box 201 to cause the closure of contacts 203 and 204 once per nautical mile of the flight resulting in the operation of the stepping device STP3 of Fig. 3 to advance the air miles counter AMC step by step. The pilot noting the reading of the counter at any time and by subtracting therefrom the initial reading may ascertain the number of air miles flown.

If desired, the counter AMC could be provided with a means for resetting it to zero similar, for example, to the resetting knob 315 and resetting gears 308 and 314 associated with the latitude counter LC so that the air miles flown on any flight could be ascertained directly from the counter without the necessity of making a calculation.

The generator MG upon operating generates a potential E$_0$ between opposite points of its rotor winding aligned with the polar axis of its field which varies with the air speed. In response to the operation of the "flux gate" primary transmitter FPT, the synchro-transformer ST2 and the amplifier-detector 221, the differential relay 214 is operated causing it to operate its armature 215 into engagement with one or the other of its associated contacts thereby causing the establishment of a circuit from ground through one or the other of the field windings of servo-motor SM, through the armature winding of the motor and thence through battery B to ground.

Motor SM is thereupon operated and through the reduction gear box 209 rotates the shaft 208 until, through the gears 258, 259 and 260 the rotor R2 of the synchro-transformer ST2 is so positioned that it receives no potential and the output of the amplifier-detector 221 is thereupon reduced to zero and relay 214 will therefore receive no current. At that time the armature 215 of relay 214 will assume its mid-position thereby opening the circuit of motor SM.

Shaft 208 has in this manner been rotated to assume an angular position corresponding to the true course angle $C_N$ and through gears 207 and 206 similarly orients the polar axis of the generator MG with respect to the pairs of brushes 210, 211 and 212, 213. Consequently, a potential is generated by the generator MG and appears across the brushes 210 and 211 as $E_1 = E_0 \cos C_N$ and a potential is generated by the generator and appears across the brushes 212 and 213 as $E_2 = E_0 \sin C_N$.

If now the vector FA of Fig. 4 be considered the distance vector of the flight, it may be expressed as having a potential value $E_0 t$. Thus the distance vector FB of the flight position A will be $FB = L = E_1 t = E_0 t \cos C_N$ or $L = E_0 t \cos C_N$ and the vector BA or $\rho$ of the flight position A will be $\rho = E_2 t = E_0 t \sin C_N$.

The potential $E_1$ or $E_0 \cos C_N$ from the brushes 210 and 211, which may be positive or negative depending upon the value of the angle $C_N$, is impressed in series with the rotor winding of the feedback generator LG and until the generator LG is driven by the motor LM in the direction and at a speed to cause the generator LG to generate a feed back potential equal and opposite to the potential $E_1$, the polarized control relay 232 will operate to move its armature 233 in such a direction as to establish an operating circuit for the motor LM whereby such motor drives the generator LG in the proper direction to generate a potential opposite in polarity to the potential $E_1$. As soon as the generator LG attains a speed such that the feedback potential generated thereby is equal and opposite to the potential $E_1$ then polarized relay 232 ceases to receive operating current and the armature 233 thereof moves to its mid-position in which the circuit of motor LM is open. The motor LM will then tend to slow down thereby reducing the speed of the generator LG and the value of the feedback potential generated thereby to a value less than the potential $E_1$. Relay 232 will thereupon again operate to establish the circuit of motor LM which again picks up speed until the generator LG again reaches a speed at which the feedback potential generated thereby equals the potential $E_1$ when relay 232 again ceases to operate and opens the circuit of motor LM. In this manner motor LM attains a substantially constant speed at which the generator LG generates a feedback potential, herein designated $E_1'$, which equals the potential $E_1$ or $E_0 \cos C_N$.

Since the motor LM through the gear box 227, cam 228 and the impulsing springs operated thereby, controls the stepping device STP1 of the indicator of Fig. 3 to advance the latitude counter LC as previously described, the counter LC will be advanced at such a speed $\omega_1$ that after the time $t$ required for the airplane to fly from point F to point A, or a latitude distance $E_1 t$ or $E_0 t \cos C_N$ it will indicate in degrees and minutes the latitude distance L of the position A of the airplane.

It is a well-known rule of geography that the change in longitudinal equivalent to a given departure varies in accordance with the secant of the average latitude angle. The basis for this assertion will be apparent from the following discussion considered in connection with the diagram of Fig. 4. It will be assumed that the longitude of point A with respect to point F is to be determined. BA and FE are similar arcs of two circles and are proportional to the radii of such circles. Therefore, if BA be designated $\rho$ and FE be designated $L_0$ or the longitude of the point A, then $$\frac{BA}{FE} = \frac{\rho}{L_0} = \frac{r}{R} \text{ or } \rho = \frac{rL_0}{R} \quad (1)$$

Now the latitude of the point A is the angle BOF which is equal to the angle AOE but angle AOE is equal to the angle OAC of the right angle triangle OAC. If now the angle OAC be designated $\lambda$ we have in the triangle OAC $$AC = AO \cos \lambda \text{ or } \cos \lambda = \frac{AC}{AO} = \frac{r}{R} \quad (2)$$

Substituting Equation 2 in Equation 1 we have $$\rho = L_0 \cos \lambda \text{ or } L_0 = \frac{\rho}{\cos \lambda} \text{ or } L_0 = \rho \text{ secant } \lambda$$

$\lambda$ is the latitude angle so it follows that $$L_0 = \frac{\rho}{\cos L}$$

or $L_0 = \rho$ secant $L$.

In the circuits under discussion the value of $\rho$ in terms of potential is determined by the potential $E_2$ derived between brushes 212 and 213 of the master generator MG and has a value assumed to be $E_2 t$ or $E_0 t \sin C_N$ and therefore the potential value of $\rho$ may be expressed $E_0 \sin C_N$. The potential value of the latitude L has already been determined as $E_1'$ or $E_0 \cos C_N$ where $E_1'$ is the feedback potential of the generator LG when such generator is operating at a speed $\omega_1$ such as to satisfy the latitude vector L.

As a consequence, through the operation of the transmitter potentiometer LTP the brush 311 of which is geared to the input shaft of the latitude counter LC, a difference of potential is produced between the point of engagement of brush 311 with its winding and the point of engagement of brush 248 of the receiver potentiometer LRP with the winding of such potentiometer and relay 247 is operated to cause the operation of the servo-motor 246 in one or the other direction to rotate the field of generator LoG through an angle equal to the latitude angle $\lambda$, at which time the brushes 311 and 248 will be in corresponding positions on the windings of the potentiometers LTP and LRP and polarized relay 247 will therefore receive no current and will consequently arrest the motor 246. Therefore, in terms of potential and considering the feedback potential generated by the generator LoG to be $E_2'$ when such generator is operating at a speed such as to satisfy the longitude vector $L_0$, Equation 3 may be written in terms of potential as $$E_2' t = t \left[ \frac{E_0 \sin C_N}{\cos \lambda} \right] \text{ or } E_2' \cos \lambda = E_0 \sin C_N \quad (4)$$

Referring again to Figs. 1A, 2 and 3, potential $E_2$ or $E_0 \sin C_N$ derived from the brushes 212 and 213 of the master generator MG, which potential may be positive or negative depending upon the value of the angle $C_N$, is impressed in series with the rotor winding of the generator LoG and until the generator LoG is driven by the motor LoM in the direction and at a speed to cause the generator LoG to generate a potential equal and opposite to the potential $E_2$, the polarized relay 251 will operate to move its armature 252 in such a direction as to establish an operating circuit for the motor LoM whereby such motor drives the generator LoG in the proper direction to generate a potential opposite in polarity to the potential $E_2$.

With the polar axis of the generator LoG rotated by the servo-motor 246 under the control of the latitude counter LC to make the latitude angle λ with respect to the brushes 253 and 254, the generator LoG upon operating generates a potential appearing at its brushes 253 and 254 which varies in accordance with the cosine of the angle λ or a feedback potential which may be expressed as $E_2'\cos\lambda$. As soon as the generator LoG attains a speed such that the feedback potential $E_2'\cos\lambda$ is equal and opposite to the potential $E_0\sin C_N$, then polarized relay 251 ceases to receive operating current and its armature 252 moves to its mid-position in which the circuit of motor LoM is opened. The motor will then tend to slow down thereby reducing the speed of the generator LoG and the value of the feedback potential generated thereby to a value less than the potential $E_2$. Relay 251 will thereupon again operate to establish a circuit of motor LoM which again picks up speed until the generator LoG again reaches a speed at which the feedback potential generated thereby equals the potential $E_2$, when relay 251 again ceases to operate and opens the circuit of motor LoM. In this manner motor LoM attains a substantially constant speed at which the generator LoG generates a feedback potential, herein designated $E_2'$, which equals the potential $E_2$ or $E_0 \cos C_N$.

Since the motor LoM through the gear box 237, cam 238 and the impulsing springs operated thereby, controls the stepping device STP2 of the indicator, Fig. 3, to advance the longitude counter LoC as previously described, the counter LoC will thus be advanced at such a speed $\omega_2$ that after the time $t$ required for the airplane to fly from the point F to the point A or a longitude distance $$t\left(\frac{E_0 \sin C_N}{\cos \lambda}\right)$$

or the longitude Lo, it will indicate in degrees and minutes the longitude of the point A of the airplane.

If the airplane is equipped with a "magnesyn" type of compass control unit and the equipment of Fig. 1B is used in place of the equipment of Fig. 1A, the master generator MG' will be driven from the air mileage motor unit AMU and the field of the generator will be oriented in accordance with the true course by the servo-motor SM' whereby the generator is caused to generate potentials which vary with the air speed of the flight and with the true course angle $C_N$ and appear at the brushes 210' and 211' and at the brushes 212' and 213' as potentials $E_0 \cos C_N$ and the $E_0 \sin C_N$, respectively. These potentials are effective to control the apparatus of Figs. 2 and 3 in the manner previously described.

To control the servo-motor SM' to orient the field of the master generator MG' in accordance with the true course angle $C_N$ the rotor of the magnesyn generator SG is turned by the earth's field to an angle $C_N$, and potentials from the stator windings of generator SG are transmitted through the windings of the balancing transformer BT, through the differential generator DG and through the corresponding stator windings of the synchro-transformer ST thereby inducing a potential into the rotor winding of such synchro-transformer. This potential is impressed upon the input side of the amplifier-detector circuit AMP and results in the operation of the armature 215' of the differential relay 214' into engagement with one or the other of its associated contacts dependent upon the phase shift of the input potential derived from the rotor winding of the synchro-transformer ST. The operation of relay 214' is thereupon effective to establish a circuit through one or the other of the field windings of motor SM' to cause such motor to rotate the rotor winding of the synchro-transformer ST until, when it has been rotated to an angular position corresponding to the angular position $C_N$ of the rotor of the synchro-generator SG, corrected by the setting of the differential generator DG by the pilot to the true course angle $C_N$, no potential will be impressed upon the rotor winding of the synchro-transformer and upon the input side of amplifier-detector AMP. Consequently relay 214' will cease to operate and will open the circuit of motor SM'. The motor SM' has thus been controlled to orient the field of the generator MG' through an angle equal to the true course angle $C_N$.

What is claimed is:

1. In an air position indicator for an aircraft, an indicator for indicating the instant latitude position of said aircraft, an indicator for indicating the instant longitude position of said aircraft, a direct current generator for generating a potential commensurate with the air speed of said aircraft, said generator having a bipolar field and two pairs of commutator brushes positioned in quadrature, means operative in accordance with the true flight course of said aircraft for causing an angular displacement between the polar axis of said generator field and said pairs of brushes whereby said potential is resolved into potentials commensurate with the instant rate of change of latitude and rate of change of departure of said aircraft, and means responsive to said latter potentials for operating said latitude and longitude indicators.

2. In an air position indicator for an aircraft, an indicator for indicating the instant latitude position of said aircraft, an indicator for indicating the instant longitude position of said aircraft, a direct current generator for generating a potential commensurate with the air speed of said aircraft, said generator having a bipolar field and two pairs of commutator brushes positioned in quadrature, a servo-motor for causing an angular displacement between the polar axis of said generator field and said pairs of brushes whereby said potential is resolved into potentials commensurate with the sine and cosine of the angle of displacement, means operable in accordance with the true flight course of said aircraft, a telemetric system operable by said latter means for controlling said servo-motor, and means responsive to said latter potentials for operating said latitude and longitude indicators.

3. In an air position indicator for an aircraft, an indicator for indicating the instant latitude position of said aircraft, an indicator for indicating the instant longitude position of said aircraft, a direct current generator for generating a potential commensurate with the air speed of said aircraft, said generator having a bipolar field and two pairs of commutator brushes positioned in quadrature, a reversible servo-motor for causing an angular displacement between the polar axis of said generator field and said pairs of brushes whereby said potential is resolved into potentials commensurate with the sine and cosine of the angle of displacement, a relay for establishing the circuit of said motor, means operable in accordance with the true flight course of said aircraft, a telemetric system operable by said latter means for controlling said relay, and means responsive to said latter potentials for operating said latitude and longitude indicators.

4. In an air position indicator for an aircraft, an indicator for indicating the instant latitude position of said aircraft, a direct current master generator for generating a potential commensurate with the air speed of said aircraft, said generator having a bipolar field and a pair of commutator brushes, means operative in accordance with the true flight course of said aircraft for causing an angular displacement between the polar axis of said generator field and said brushes whereby an output potential is derived across said brushes which varies with the cosine of the true course angle, a direct current feedback generator, a reversible motor coupled to said latter generator, a relay for controlling the operation of said motor in one or the other direction of rotation and controllable by the difference between the output potentials of said generators whereby said motor is caused to drive said feedback generator at a speed such that the feedback potential generated thereby is maintained equal and opposite to the output potential of said master generator, and means controlled by said motor for operating said latitude indicator.

5. In an air position indicator for an aircraft, an indicator for indicating the instant latitude position of said aircraft, a direct current master generator for generating a potential commensurate with the air speed of said aircraft, said generator having a bipolar field and a pair of commutator brushes, means operative in accordance with the true flight course of said aircraft for causing an angular displacement between the polar axis of said generator field and said brushes whereby an output potential is derived across said brushes which varies with the cosine of the true course angle, a direct current feedback generator, the rotor winding of which is connected in a series circuit with the rotor winding of said master generator, a reversible motor coupled to said feedback generator, a three-position polarized relay having its winding interposed in said series circuit, said relay being responsive to a difference between the output potentials of said generators for controlling said motor whereby said motor is caused to drive said feedback generator in one or the other directions of rotation at a speed such that the feedback potential generated thereby is maintained equal and opposite to the output potential of said master generator, and means controlled by said motor for operating said latitude indicator.

6. In an air position indicator for an aircraft, an indicator for indicating the instant latitude position of said aircraft, an indicator for indicating the instant longitude position of said aircraft, a direct current generator for generating a potential commensurate with the air speed of said aircraft, said generator having a bipolar field and two pairs of commutator brushes positioned in quadrature, means operative in accordance with the true flight course of said aircraft for causing an angular displacement between the polar axis of said generator field and said pairs of brushes whereby a potential is derived across one pair of said brushes which varies with the sine of the true course angle and a potential is derived across the other pair of brushes which varies with the cosine of the true course angle, means controlled by said cosine potential for operating said latitude indicator, means controlled by said latter indicator for generating a potential which varies in accordance with the cosine of the latitude angle, and means controlled jointly by said latter potential and by said sine potential for operating said longitude indicator.

7. In an air position indicator for an aircraft, an indicator for indicating the instant latitude position of said aircraft, an indicator for indicating the instant longitude position of said aircraft, a direct current master generator for generating a potential commensurate with the air speed of said aircraft, said generator having a bipolar field and two pairs of brushes positioned in quadrature, means operative in accordance with the true flight course of said aircraft for causing an angular displacement between the polar axis of said generator field and said pairs of brushes whereby a potential is derived across one pair of said brushes which varies with the sine of the true course angle and a potential is derived across the other pair of brushes which varies with the cosine of the true course angle, means controlled by said cosine potential for operating said latitude indicator, a direct current feedback generator having a bipolar field and a pair of brushes, means controlled by said latitude indicator for causing an angular displacement between the polar axis of the field and the brushes of said feedback generator whereby a potential is attained across the brushes of said feedback generator which varies with the cosine of the angle of latitude, a reversible motor for driving said latter generator, a relay for controlling the operation of said motor in one or the other direction and controllable by the difference between the output potentials of said generators whereby said motor is caused to drive said feedback generator at a speed such that the feedback potential generated thereby is maintained equal and opposite to the sine potential output of said master generator, and means controlled by said motor for operating said longitude indicator.

8. In an air position indicator for an aircraft, an indicator for indicating the instant latitude position of said aircraft, an indicator for indicating the instant longitude position of said aircraft, a direct current master generator for generating a potential commensurate with the air speed of said aircraft, said generator having a bipolar field and two pairs of commutator brushes positioned in quadrature, means operable in accordance with the true flight course of said aircraft for causing an angular displacement between the polar axis of said generator field and said pairs of brushes whereby a potential is derived across one pair of said brushes which varies with the sine of the true course angle and a potential is derived across the other pair of said brushes which varies with the cosine of the true course angle, a first feedback generator, a first reversible motor coupled therewith, a relay for controlling the operation of said motor in one or the other direction of rotation and controllable by the difference between the output potential of said feedback generator and the cosine potential of said master generator whereby said motor is caused to drive said feedback generator at a speed such that the feedback potential generated thereby is maintained equal and opposite to the cosine potential of said master generator, means controlled by said motor for operating said latitude indicator, a second direct current feedback generator having a bipolar field and a pair of commutator brushes, a servo-motor telemetrically controlled by said latitude indicator for causing an angular displacement between the polar axis of the field and the brushes of said latter generator whereby a potential is attained across the brushes of said latter generator which varies with the cosine of the angle of latitude, a second reversible motor for driving said latter generator, a relay for controlling the operation of said latter motor in one or the other direction of rotation and controllable by the difference between the output potential of said latter generator and the sine potential of said master generator whereby such motor is caused to drive said second feedback generator at a speed such that the feedback potential generated thereby is maintained equal and opposite to the sine potential output of said master generator, and means controlled by said latter motor for operating said longitude indicator.

9. In an air position indicator for an aircraft, an indicator for indicating the true compass course, an indicator for indicating the instant latitude position of said aircraft, an indicator for indicating the instant longitude position of said aircraft, a direct current generator for generating a potential commensurate with the air speed of said aircraft, said generator having a bipolar field and two pairs of commutator brushes positioned in quadrature, an earth inductor primary transmitter, a synchro-transformer controllable thereby, a differential generator interposed between said transmitter and said synchro-transformer for introducing compass correction, servo means controlled by said synchro-transformer for causing an angular displacement between the polar axis of said generator field and said pairs of brushes whereby said potential is resolved into potentials commensurate with the instant rate of change of latitude and rate of change of departure of said aircraft, means responsive to said latter potentials for operating said latitude and longitude indicators, and means controlled by said servo means for controlling said true course indicator.

10. In an air position indicator for an aircraft, an indicator for indicating the true compass course, an indicator for indicating the instant latitude position of said aircraft, an indicator for indicating the instant longitude position of said aircraft, a direct current generator for generating a potential commensurate with the air speed of said aircraft, said generator having a bipolar field and two pairs of commutator brushes positioned in quadrature, an earth inductor primary transmitter, a synchro-transformer controllable thereby, a differential generator interposed between said transmitter and said synchro-transformer for introducing compass correction, servo means controlled by said synchro-transformer for causing an angular displacement between the polar axis of said generator field and said pairs of brushes whereby said potential is resolved into potentials commensurate with the instant rate of change of latitude and rate of change of departure of said aircraft, means responsive to said latter potentials for operating said latitude and longitude indicators, a secondary transmitter controlled by said servo means and a synchro-receiver controlled thereby for controlling said true course indicator.

11. In an air position indicator for an aircraft, an indicator for indicating the true compass course, an indicator for indicating the instant latitude position of said aircraft, an indicator for indicating the instant longitude position of said aircraft, a direct current generator for generating a potential commensurate with the air speed of said aircraft, said generator having a bipolar field and two pairs of commutator brushes positioned in quadrature, an earth inductor primary transmitter, a synchro-transformer controllable thereby, a differential generator having its stator windings connected with said earth inductor primary transmitter and having its rotor winding connected with the stator windings of said synchro-transformer, means for rotating the stator windings of said generator to introduce compass correction, servo means controlled by said synchro-transformer for causing an angular displacement between the polar axis of said generator field and said pairs of brushes whereby said potential is resolved into potentials commensurate with the instant rate of change of latitude and rate of change of departure of said aircraft, means responsive to said latter potentials for operating said latitude and longitude indicators, a secondary transmitter controlled by said servo means and a synchro-receiver controlled thereby for controlling said true course indicator.

WILLIAM H. T. HOLDEN.

REFERENCES CITED

The following references are of record in the file of this patent:

UNITED STATES PATENTS

| Number | Name | Date |
| --- | --- | --- |
| 1,728,904 | Herr | Sept. 17, 1929 |
| 2,066,949 | Ruiz | Jan. 5, 1937 |
| 639,957 | Ball | Dec. 26, 1899 |
| 1,796,193 | Eaton | Mar. 10, 1931 |
| 1,704,250 | Holmes | Mar. 5, 1929 |
| 2,022,275 | Davis | Nov. 26, 1935 |
| 2,080,186 | Reymond | May 11, 1937 |
| 2,201,559 | Moseley | May 21, 1940 |
| 2,241,499 | Barth | May 13, 1941 |
| 2,376,883 | Reggs | May 29, 1945 |
| 2,403,152 | Roters | July 2, 1946 |
| 2,406,836 | Holden | Sept. 3, 1946 |

FOREIGN PATENTS

| Number | Country | Date |
| --- | --- | --- |
| 164,765 | Great Britain | June 23, 1921 |
| 462,830 | Great Britain | Mar. 16, 1937 |